UNITED STATES PATENT OFFICE.

EMILE BRONNERT, OF NIEDERMORSCHWEILER, GERMANY.

NON-INFLAMMABLE CELLULOID-LIKE MASS AND PROCESS OF PRODUCTION THEREOF.

1,153,596.      Specification of Letters Patent.      Patented Sept. 14, 1915.

No Drawing.      Application filed October 25, 1911. Serial No. 656,695.

*To all whom it may concern:*

Be it known that I, EMILE BRONNERT, a subject of the German Emperor, residing at Niedermorschweiler, Germany, have invented certain new and useful Improvements in Non-Inflammable Celluloid-like Masses and Processes of Production Thereof, of which the following is a specification.

The production of a celluloid substitute which would be cheap and not self-inflammable, has been diligently sought after in the industry. Previously proposed processes for obtaining such products are rather expensive, requiring acetic acid anhydrid, and requiring often for the production of cellulose ester, condensing agents which must be subsequently removed.

I have now discovered that masses representing a great technical advance with respect to cheapness and safety as regards fire, can be produced under certain conditions from the cellulose formates which have been obtained recently, for instance from artificial cellulose silk waste, without the use of any special condensing agent. Instead of these formates there may be employed the acid esters, obtained by the aid of formic acid and phosphoric acid, in mixture with camphor or the well-known camphor substitutes. The materials or masses thus produced, consisting of formylic cellulose derivatives, *i. e.* of formylcellulose (cellulose formate) or of cellulose phosphoformate and containing a camphor-substance, have the physical properties of celluloid but are non-inflammable.

If by the addition of acetone a precipitate is formed in a solution of cellulose formates, such as formyl cellulose or its derivatives *e. g.* cellulose formyl phosphate, in formic acid, only flocculent deposits will be formed. If however we add amyl acetate, amyl formate, or alcohol (methyl or ethyl alcohol, pure or diluted with water), or a mixture of hydrocarbon and alcohol (spirits) and the like, a tough mass will be deposited at once at the bottom of the receptacle.

The supernatant liquid is poured off and the deposit is washed with a further amount of the precipitating agent. Upon stirring, the mass will exude still further quantities of liquid. There remains finally a semi-solid jelly-like mass, as clear as glass, which in this condition can be mixed very readily with camphor or camphor substitutes, such as triphenyl phosphate and the like, which are insoluble in water. The mixture finally solidifies to a firm, transparent mass which receives further treatment in the manner customary in the manufacture of celluloid.

While as has become known through French Patent No. 412,797, hydrocarbons and alcohol when warmed dissolve cellulose acetates, it is surprising that upon a cellulose formate, such as formylcellulose or cellulose-formyl-phosphate, they do not have this action. The mixture on the contrary acts as a precipitating agent, whether hot or cold; it is not impossible that it enters into the reaction as water of crystallization or the like.

The precipitating agent can be recovered readily by freeing it of formic acid by means of anhydrous sodium carbonate for example. The sodium formate removed by pressure is for example decomposed with the aid of sulfuric acid and then, in the form of formic acid, returned to the cycle of operations for dissolving cellulose, thus securing the greatest economy imaginable.

Example I: 100 kilograms of artificial silk waste (cellulose) are dissolved, say in 1,000 kilograms of concentrated, say 98%, formic acid and to this we add say three or four times the amount of amyl acetate. Upon stirring, a semi-solid mass of formyl cellulose will form a lump at the bottom of the receptacle. This mass is quickly separated from the supernatant liquid and then kneaded by itself (preferably warming it slightly say to 30 to 40° C.). During this operation the phenomenon of retraction, well-known with colloids, will occur, that is to say, the mass will spontaneously exude further amounts of liquid, especially formic acid, and the remaining substance become jelly-like and firmer. While it is in this condition, 20 kg. of camphor are added to the mass, which is then kneaded further and finally allowed to solidify.

Example II: 100 kilograms of cotton or other cellulose are stirred in a mixture of say 1,000 kilograms of concentrated phosphoric acid (specific gravity 1.75) and 1,000 kilograms of concentrated formic acid until solution takes place. To the viscous solution a mixture of toluol and alcohol is added until, upon stirring, a semi-solid coagulated mass has settled on the agitator. This mass is separated from the liquid and, washed, preferably while warming it say to 30 to 40° C., with some further toluol and alcohol.

The coagulated mass, originally whitish soon becomes transparent and firmer while giving off further amounts of liquid. At this stage 15 kilograms of triphenyl-phosphate are kneaded into the mass until dissolved, and then the mass is allowed to solidify.

In the claims, by the words "cellulose formates" formylic compounds derived from cellulose generally, as for instance, formyl cellulose, cellulose formyl phosphates, or other formyl derivatives, are to be understood as included; and by the term "substance having the specific effect of camphor" is to be understood, beside camphor, substances having the effect of rendering cellulose derivatives soft and elastic. The substances referred to may be considered as solvents for the cellulose derivatives, acting as an emollient.

What I claim is:—

1. Production of celluloid-like masses from cellulose formates, which consists in precipitating the cellulose formates as a slimy mass from their solution in formic acid by means of suitable organic precipitating agents, separating the contained solvent and precipitating agent and kneading this mass with a solid water-insoluble solvent and emollient of the cellulose formate while plastic and treating the same to form a solid elastic body.

2. The herein described process of producing a celluloid-like product, which consists in depositing cellulose formates in a tough mass from a solution by means of a suitable precipitating agent, then separating the solvent and precipitating agent from the precipitate thus obtained, and then kneading with a solid water-insoluble solvent and emollient of the cellulose formate while plastic and treating to form a solid elastic body.

3. In a process of producing a celluloid-like product the step which comprises depositing cellulose formates in a homogeneous plastic mass from a solution by means of a suitable precipitating agent.

4. In a process of producing a celluloid-like product the step which comprises depositing cellulose formates in a tough plastic mass from a solution by means of a suitable organic precipitating agent.

5. The herein described process of producing a celluloid-like product which comprises depositing cellulose formates in a tough mass from a solution by means of a suitable precipitating agent, and kneading with a solid water-insoluble solvent and emollient of the cellulose formate.

6. The herein described process of producing a celluloid-like product, which comprises depositing cellulose formates in a homogeneous plastic mass from a solution by means of a suitable precipitating agent, and kneading with a solid water-insoluble solvent and emollient of the cellulose formate.

7. The herein described product consisting of a plastic formyl-cellulose and a solid water-insoluble solvent and emollient of the cellulose formate, and having the physical properties of celluloid but being non-inflammable.

8. The herein described product consisting of a plastic formyl-cellulose and triphenylphosphate, and having the physical properties of celluloid but being non-inflammable.

In witness whereof, I have hereunto signed my name in the presence of two subscribing witnesses.

EMILE BRONNERT.

Witnesses:
  HENRY HASPER,
  WOLDEMAR HAUPT.